W. M. OSBORN.

RAILWAY TIE PLATE.

APPLICATION FILED MAR. 5, 1921.

Reissued July 26, 1921. 15,167.

Inventor

Warren M. Osborn

By J. McRoberts his Attorney

UNITED STATES PATENT OFFICE.

WARREN M. OSBORN, OF CHICAGO, ILLINOIS, ASSIGNOR TO CHICAGO MALLEABLE CASTINGS COMPANY, OF CHICAGO, ILLINOIS, A CORPORATION OF ILLINOIS.

RAILWAY TIE-PLATE.

15,167. Specification of Reissued Letters Patent. Reissued July 26, 1921.

Original No. 1,362,732, dated December 21, 1920, Serial No. 369,451, filed March 29, 1920. Application for reissue filed March 5, 1921. Serial No. 450,064.

*To all whom it may concern:*

Be it known that I, WARREN M. OSBORN, a citizen of the United States, and a resident of Chicago, in the county of Cook and State of Illinois, have invented certain new and useful Improvements in Railway Tie-Plates, do hereby declare that the following is a full, clear, and exact description of the same.

My invention relates to railway tie plates, its object being to provide new and improved means for utilizing the same plates for rails having bases of different or varying cross-sections or widths.

The invention consists of the matters hereinafter described and then pointed out in the claims.

In the drawings, Figure 1 is a cross-sectional-view of the plate and an associated rail having a base of relatively small width with the spikes in the outer ends of the spike-holes and the spike-plugs between the spikes and rail-base, parts being in perspective and broken away for convenience of illustration;

Figure 1:
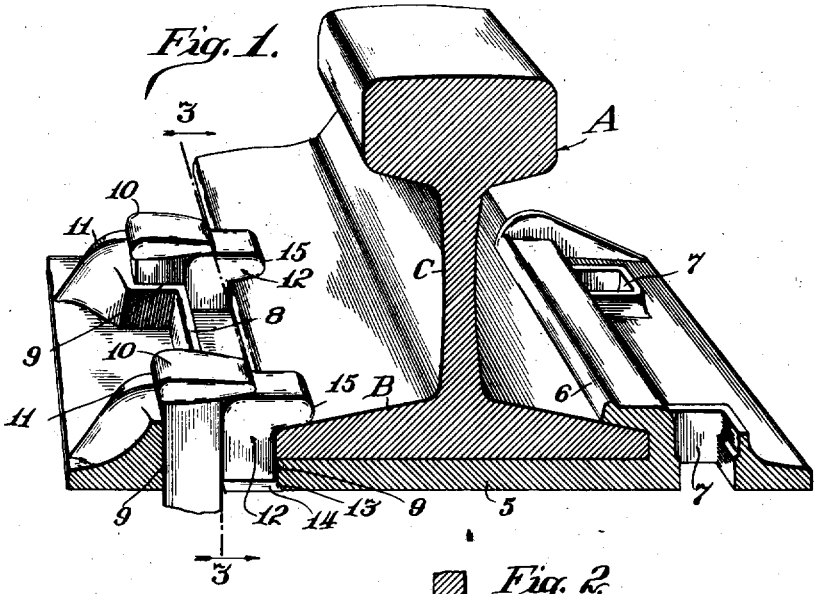

In the drawing the reference letter A represents the head of a rail, B its base, and C the web uniting the head and base.

The tie plate consists of the usual body 5 provided near one side with an overhanging flange 6 which extends the full length of the plate to engage the corresponding side of the rail base, and with spike holes 7 outside the base of the flange to receive the spikes for that side of the plate, the flange preferably making a drive-fit with the rail base. The plate also is provided near its opposite side with an abutment 8 which is interrupted by the spike holes 9 to receive the usual spikes 10 which are driven into the underlying tie to assist in holding the plate on the tie and the rail on the plate. Each spike hole 9 is preferably provided at its outer margin with a heeling-lug 11 against which the heel or back portion of the spike abuts when the spike is driven to place, so that the spike is buttressed against the strains arising from the tendency of the rails to spread or tip sidewise, and the inner faces of the lugs 11 are inclined inwardly and downwardly. When the plate is not provided with the lugs the spikes bear against the outer ends of the holes.

The spike holes 9 are elongated in the cross-sectional line or width of the plate so that spikes may be driven through their outer portions into the underlying tie, and spike-plugs 12 of various size inserted between the spikes and rail-base according to differences in the width or cross-section of the rail-base to hold it in position on the plate. In the plate shown the distance between the abutment 8 and the inner vertical wall of the flange 6 is sufficient to accommodate the base of a large or heavy rail of any standard size or cross-section, say a 90 pound rail, and when such rail is in position its base fills the space between these opposite parts and the spikes for the holes 9 will pass through the outer portions of these holes and abut against the heeling-lugs which wedge them against the rail-base and with their heads overlying the rail base. When a rail is used having a narrower base, say a 65 pound rail, the spikes for the holes 9 will be supplemented by spike-plugs 12 located between the spikes and the rail-base.

Figure 2:
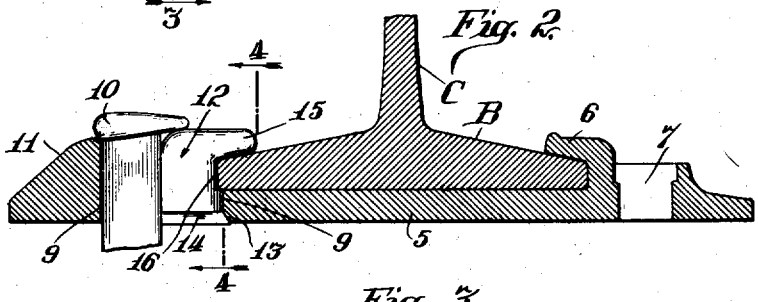
Fig. 2 is a sectional view showing the same arrangement of parts as Fig. 1 and an alternative form of plug.
Figure 3:
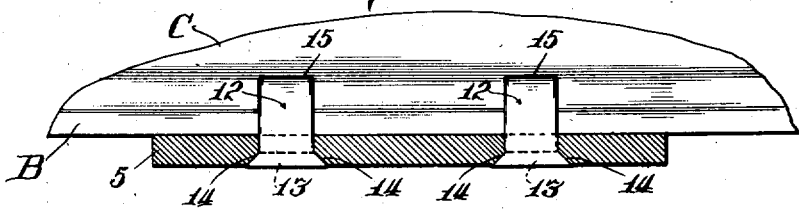
Fig. 3 is a sectional view on the line 3—3 of Fig. 1.
Figure 4:
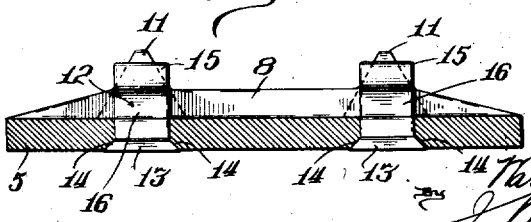
Fig. 4 is a sectional view on the line 4—4 of Fig. 2.

The spike-plugs 12 are individual pieces of metal adapted to be inserted in the elongated spike holes 9 and are of sufficient cross-sectional area to fill up the gap that otherwise would exist between a spike 10 and the rail-base, it being obvious that they will be made of different sizes in this respect so that such gaps of varying widths may be filled according as the size of the rail base may vary. In the drawing, for illustration, I show a spike-plug 12 adapted to fill the gap caused by the decrease in width of the base of a 65 pound rail in comparison with the width of a rail base that itself would fill the space between the parts 6 and 8. Preferably the spike-plugs interlock with the plate 5, and for this purpose each plug may be provided along the inner and lateral edges of its lower end with suitable flanges 13 and 14, respectively, which rest in correspondingly countersunk portions of the inner and lateral walls of the lower ends of the spike holes. The inner flange may be omitted, as the side flanges lock the plug to the plate in effective manner. The plugs are inserted into the spike holes from below, and their flanges prevent them from being dislodged upwardly, while their lower ends are flush with the bottom of the plate and rest on the underlying tie, so that they are held against accidental displacement. The plugs are provided at their upper ends with inwardly directed wings 15, which overlie the rail-base; when the spikes 10 are driven to place the wedge action of the lugs 11, causes the spikes to crowd the plugs against the rail base and to force the wings down upon the upper face of the base. Also, in the form shown in Figs. 2 and 4 the inner wall of the body of the plug between its flange 13 and wing 15 is recessed or cut-back as shown at 16 to form a cross-channel corresponding in height to the end of the rail-base and in which the end rests, thereby interlocking the plug and base when the parts are assembled. In both of the forms shown the rail cannot move up and down on the plate; even if the spike rises under the strains to which it is subjected by the traffic on the rail the plug remains in its original and intended position as it is locked by its retaining flanges under the plate 5 and the rail remains in its corresponding position on the plate as it is interlocked between the plug and plate.

In using the plugs they are placed in position in the spike-holes, after the rail base is positioned under the flange 6, and the spikes 10 are then driven to place, and are heeled up by the lugs and abut against the plugs to wedge the rail base in place beneath the flange.

The wings of the plugs are of a size to pass through the holes in the plates in alinement with the length thereof, and the plugs are assembled on the plates by passing their upper ends through the holes from below and so are at once in position to engage over the rail-base by the wedging action of the spikes as the latter are driven into the underlying tie, thus doing away with all necessity to further manually locate the plugs in a certain predetermined position before the wings can engage the base or to manually turn the plugs in order to effect this engagement. Also, as the lower flanges of the plugs are substantially in line with the seats in the lower face of the plate the plugs will readily move upon the surface of the ties to position to engage the rail-base by the wedging action of the spikes as they are driven to place, and the device can be employed on the ordinary wooden ties without any preliminary preparation or cutting of the latter, and under all conditions of use the parts form a unitary structure as under any tendency of the spikes to pump or work loose the flanges retain the plugs in position and prevent them from rising under the stress or friction of a pumping spike. Further, the coöperation of the flanges with their countersunk seats preserves the alinement of the plug on the plate with its wing in position to engage the rail-base as the driven spike crowds the plug toward the rail, and also prevents the plug from turning even if the spike works loose.

I claim:

1. A tie plate for rails comprising a body having elongated spike holes extending transversely thereof to receive a spike in the outer end of each hole, and spike-plugs fitting between the spikes and rail-base, each plug having flanges at its base to engage the lower end of its spike-hole, and having a wing of a size to pass through the spike-hole from below in alinement with the length thereof to overlie the base when the spike is driven to place.

2. A tie plate for rails comprising a body having elongated spike holes extending transversely thereof to receive a spike in the outer end of each hole and countersunk at their lower ends, and spike-plugs in the holes between the spikes and rail-base, each plug having retaining flanges at its base interlocking with the countersunk ends of its spike-hole, and having a wing of a size to pass through the spike-hole from below in alinement with the length thereof to overlie the base when the spike is driven to place.

3. A tie plate for rails comprising a body having elongated spike holes extending transversely thereof, a lug extending above the outer end of each hole to heel the spike therein, and spike-plugs fitting between the spikes and rail-base, each plug interlocking with its plate and having a wing overlying the base.

4. A tie plate for rails comprising a body having elongated spike holes extending transversely thereof to receive a spike in the outer end of each hole, and a spike-plug fitting between the rail-base and the spike and having a wing overlying the base and a cross-channel to receive the base, the lower end of the plug being flnaged, and the lower end of the spike-hole being countersunk to interlock therewith.

5. A tie plate for rails comprising a body, an overhanging flange to engage one side of the rail-base, the body having elongated spike holes extending transversely thereof, a lug extending above the outer end of each hole to heel the spike therein, and a spike-plug fitting between the rail-base and the spike and having a wing overlying the base, the lower end of the plug having lateral flanges, and the lower end of the spike-hole being countersunk to receive the flanges.

In testimony whereof I affix my signature this 28th day of February, 1921.

WARREN M. OSBORN.